United States Patent [19]
Pearson

[11] Patent Number: 4,525,926
[45] Date of Patent: Jul. 2, 1985

[54] MANUFACTURING RECOMBINATION ELECTRIC STORAGE CELLS

[75] Inventor: Ernest J. Pearson, Swinton, England

[73] Assignee: Chloride Group Public Limited Company, London, England

[21] Appl. No.: 547,098

[22] Filed: Oct. 31, 1983

[30] Foreign Application Priority Data

Oct. 29, 1982 [GB] United Kingdom ............... 8230953

[51] Int. Cl.³ ........................................... H01M 10/12
[52] U.S. Cl. .................................. 29/623.1; 204/2.1; 429/225
[58] Field of Search ................. 429/57, 160, 225; 29/623.5; 204/2.1

[56] References Cited

U.S. PATENT DOCUMENTS

| | | | |
|---|---|---|---|
| 2,528,266 | 10/1950 | Daily et al. | 204/2.1 |
| 2,702,308 | 2/1955 | Jansson | 204/2.1 |
| 2,887,522 | 5/1959 | MacKenzie | 204/2.1 |
| 3,862,861 | 1/1975 | McClelland et al. | 429/57 |
| 4,383,011 | 5/1983 | McClelland et al. | 429/54 |

*Primary Examiner*—Anthony Skapars
*Attorney, Agent, or Firm*—Finnegan, Henderson, Farabow, Garrett & Dunner

[57] ABSTRACT

A method of manufacturing recombination electric storage cells includes assembling a plurality of cell packs comprising alternating positive and negative electrodes interleaved with compressible fibrous absorbent separator material. Each cell pack is placed in a respective open plastics bag and the cell packs are constrained to occupy a volume which is less than their natural volume. The cell packs are then immersed in electrolyte thereby saturating the electrodes and separator material and then electrolytically formed by passing an electric current through them. The cell packs are subsequently inserted into their final outer container.

9 Claims, 5 Drawing Figures

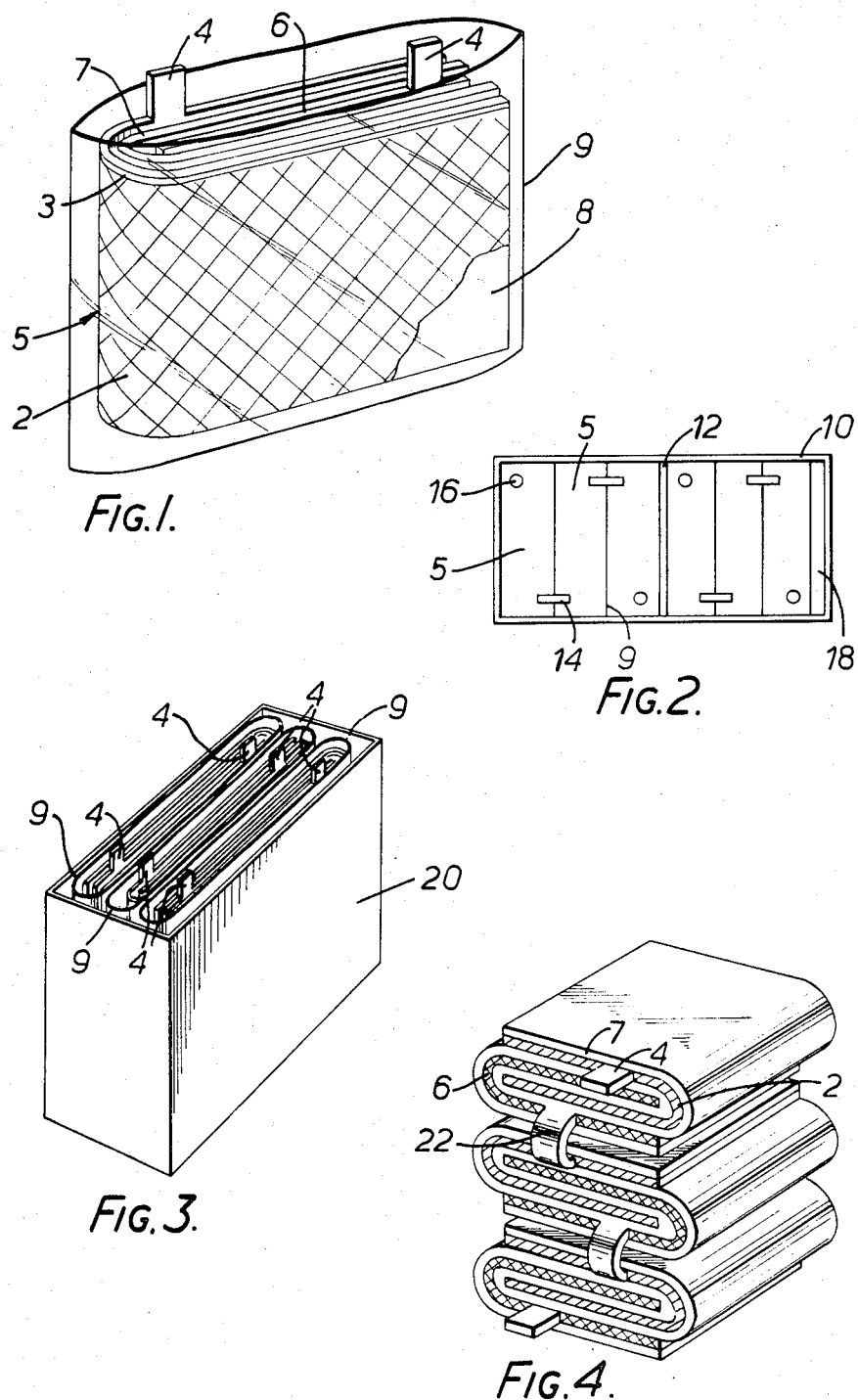

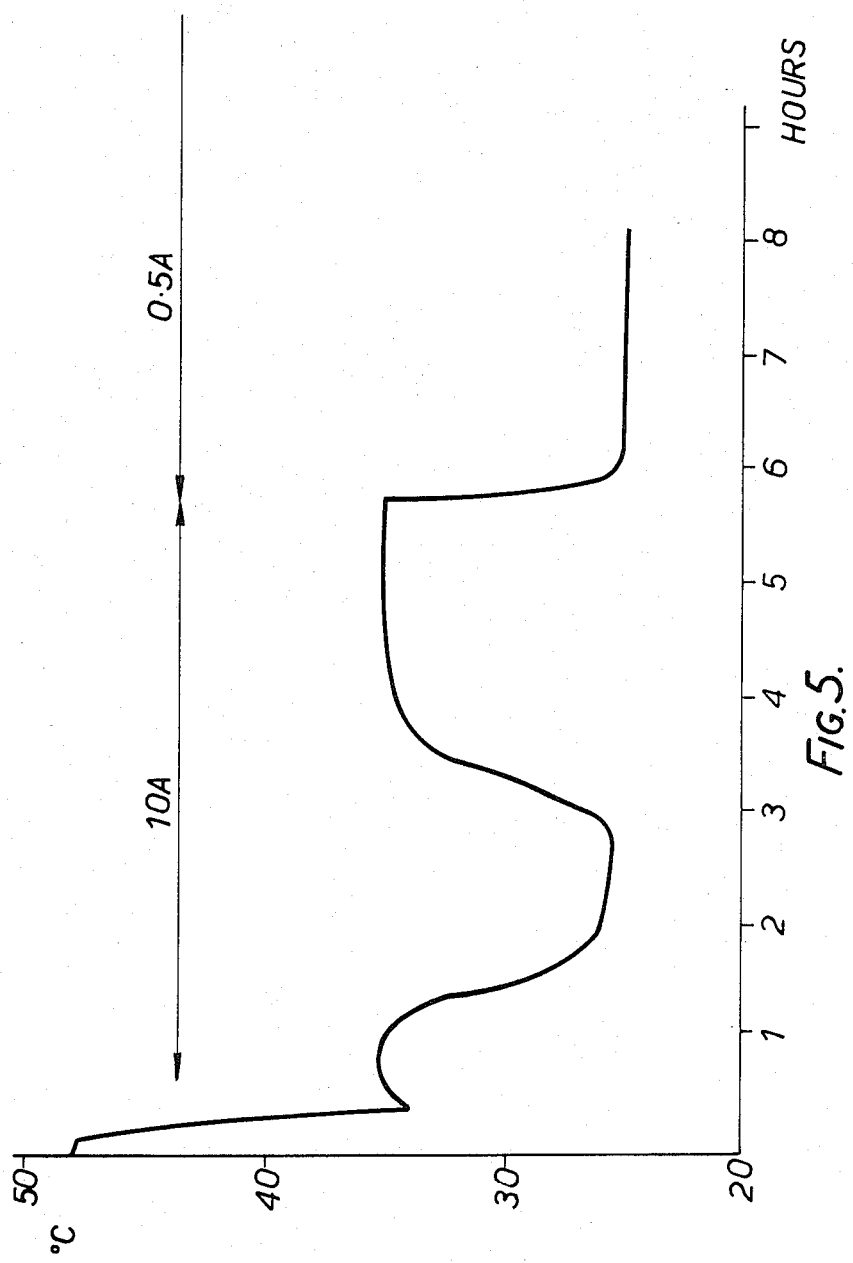

MANUFACTURING RECOMBINATION ELECTRIC STORAGE CELLS

The present invention relates to the manufacture of recombination electric storage cells, in particular though not exclusively of lead acid type, and of batteries of such cells and is concerned with the filling of such cells with electrolyte.

Recombination electric storage cells are those cells which contain substantially no free unabsorbed electrolyte and in which gas evolved during operation or charging is normally not vented to the atmosphere but is induced to recombine within the cell.

Since such cells contain substantially no free unabsorbed electrolyte and in fact generally contain an amount of electrolyte which is insufficient to saturate all the pores in the electrodes and separators of the cell, at least after it has been in service for a period of time, it is found to be very difficult to add the electrolyte to such cells because there is a tendency for the electrolyte to accumulate in and thus saturate certain local areas of the cells thus leaving other areas of the cells dry or with insufficient electrolyte. If this should occur the cell will never function properly since a proportion of the area of the electrodes does not have a sufficient amount of electrolyte available for its electrochemical requirements and at these areas the electrodes of lead acid cells tend to "tree through" thus internally short-circuiting the cell.

Whilst it is essential that such cells contain substantially no free unabsorbed electrolyte if the recombination mechanism is to operate effectively it is desirable that they should contain an excess of electrolyte whilst being formed. Formation is the process to which electric storage cells are subjected during manufacture to convert the electrode material to its electrochemically active form and in lead acid cells involves the oxidation and reduction of the lead oxide on the positive and negative plates to lead dioxide and spongy lead respectively.

Conventional electric storage batteries of flooded electrolyte type are accommodated within a compartmented container which is constructed to ensure that in the finished battery adjacent cells are electrolytically sealed from one another to prevent the flow of intercell ionic leakage currents which degrade the performance of the battery and ultimately reduce its service life. It is however found that in recombination electric storage batteries such ionic leakage currents do not pose a substantial problem, the reason for which is believed to be that there is substantially no free electrolyte available for the conduction of the leakage currents. This enables recombination batteries to be constructed in which adjacent cells are not electrolytically sealed from one another and British Patent Specification No. 2062945 of the present applicants proposes a recombination battery construction which takes advantage of this freedom and in which each cell is contained in a respective plastics bag and the battery container is uncompartmented so that the intercell partitions are constituted only by the material of adjacent pairs of plastics bags.

The cells of the battery disclosed in this prior specification require individual filling with electrolyte, as is the case with conventional battery constructions, and this filling is a time-consuming and thus expensive procedure. In addition, the filling of the cells of the battery dislosed in this prior specification whilst they are in the battery container is found to have the problem that any drops of electrolyte which are inadvertently spilled between the plastics bags of adjacent cells remain there in unabsorbed form and are available for the conduction of intercell ionic leakage currents.

It is an object of the present invention to provide a method of manufacturing recombination electric storage cells and batteries in which the filling of the cells is facilitated and made more reliable by taking advantage of the possibility of accommodating the cells in individual plastics bags.

According to the present invention there is provided a method of manufacturing recombination electric storage cells including the assembly of a plurality of cell packs comprising alternating positive and negative electrodes interleaved with compressible fibrous absorbent separator material, placing each cell pack in a respective open plastics bag, constraining the cell packs to occupy a volume which is less than their natural volume, immersing the cell packs in electrolyte thereby substantially saturating the electrodes and separator material, passing an electric current through each cell pack to form it and inserting the cell packs into their final outer container. Thus in the method of the present invention electrolyte is added to a plurality of cell packs simultaneously prior to their insertion in their final container rather than to each cell pack individually as has previously been the case. It is not necessary to meter the amount of electrolyte added to each cell pack, but instead this amount is controlled by controlling the volume of the cell packs.

Conveniently the cell packs are placed with their open end upwards in an electrolyte container into which electrolyte is introduced to immerse the cell packs whereafter each cell pack is full with electrolyte up to the top of its plastics bag and excess electrolyte is drained from the container. Thus the cell packs may be compressed simultaneously by a predetermined amount simply by inserting them into an appropriately dimensioned container into which electrolyte is subsequently introduced and from which excess electrolyte is subsequently drained.

The flooding of the cell packs with electrolyte facilitates the wetting of the separator material interleaved between the electrodes over its entire area, but nevertheless there is still a possibility that certain areas of the separator material may remain dry since gases, such as carbon dioxide, are formed when adding sulphuric acid to the cell packs for a lead acid battery. Accordingly it is preferred that the cell packs are subjected to a sub-atmospheric pressure whilst immersed in the electrolyte since it is found that this sub-atmospheric pressure, and the release thereof, tend to remove gases which may be formed and promote the saturation of all the separator material.

The cell packs may be formed after insertion into the battery container, as is conventional, but it is preferred that the formation is effected before the cell packs are inserted into the container. Formation produces a substantial amount of heat, and performing it prior to insertion of the cell packs into the final container permits formation to be conducted more rapidly than is usual since the plastics bags in which the cell packs are accommodated, the walls of which are preferably less than 1 mm and more preferably less than 0.25 or 0.1 mm thick, are relatively good conductors of heat. Thus in a preferred embodiment of the invention the cell packs are formed whilst substantially immersed in a water bath subsequent to which they are inserted into their final outer container. The water in the bath rapidly conducts away heat generated in the cell packs and thus permits the latter to be formed at a higher current than is usual. Whilst it might be possible to form the cell packs whilst they are still constrained to occupy the said volume less than their natural volume, for instance whilst still in the electrolyte container, this would entail the risk of acid splashing out from the full plastics bags during formation and in addition this would substantially prevent the cell packs being cooled in the water bath. Accordingly it is preferred that the cell packs are permitted to expand from their constrained volume prior to being formed, that is to say the cell packs are removed from the container or one or more cell packs or a packing piece in the container are removed therefrom, with the result that the acid level in the plastics bags falls and the cell packs can be disposed in the formation water bath at a distance from each other thereby permitting the circulation of cooling water around them.

During the formation process a proportion of the excess electrolyte is electrolysed and thus gassed off. Any excess electrolyte remaining in the cell packs will be gradually gassed off in the cells during service and the cells will only commence efficient recombination operation once the amount of electrolyte present in them has reached the critical level, that is to say there is insufficient electrolytes to saturate the electrodes and separator material. It is however possible to compress the cell packs subsequent to their formation and prior to inserting them into their final container to expel at least a proportion of their electrolyte which will reduce the amount of electrolyte which needs to be gassed off in the finished cells.

The cells manufactured in accordance with the invention may be subsequently used as individual cells or alternatively they may be interconnected to form batteries. In either event the electrodes of each polarity in each cell may be integral with one another or alternatively they may be separate in which case the method preferably includes connecting the electrodes of the same polarity in the same cell together to enable the cell packs to be formed. The invention also embraces a method of manufacturing a battery comprising two or more cells manufactured as described above in which case adjacent cells may be connected together either before or after adding the electrolyte or their formation.

Further features and details of the invention will be apparent from the following description of certain specific embodiments which relate to a method of assembling a three cell 6 volt lead acid standby recombination storage battery which is given by way of example with reference to the accompanying diagrammatic drawings, in which:

FIG. 1 is a perspective view of a single cell pack within a plastics bag;

FIG. 2 is a plan view of six cell packs within an electrolyte container;

FIG. 3 is a perspective view of a battery of three cell packs within an outer container;

FIG. 4 is a perspective view of three integrally interconnected cell packs; and

FIG. 5 is a graph showing the variation of the temperature of the interior of the battery with time as the battery is formed.

Referring first to FIGS. 1 and 2, a plurality of electrode grids of lead or lead alloy are formed by any conventional method, e.g. by casting or as in the present case, expanding a strip of lead or lead alloy and subsequently cutting it into individual grids. The grids are subsequently pasted with positive and negative active electrode material respectively, or alternatively with a single universal active electrode material. In this case each negative electrode 2 which is provided with a current take-off lug 4 about half way along its length is approximately twice as long as each positive electrode 6 which is provided with a current take-off lug 4 at one end. Each electrode is provided with a solid selvedge 3 along its upper edge with which the respective current take-off lug 4 is integral. The electrodes are then assembled whilst the active electrode material, of which a portion is designated 8, is still damp into cell packs 5, each of which comprises alternating positive and negative electrodes interleaved with compressible fibrous absorbent separator material 7, in this case microfine glass fibre material of the type disclosed in the prior specification referred to above. If each cell pack includes a plurality of both positive and negative electrodes of conventional rectangular type with an upstanding plate lug plate straps are then formed connecting together plates of the same polarity in each cell pack and intercell connectors are formed also connecting together plate straps of one polarity in one cell with a plate strap of opposite polarity in an adjacent cell. However, in this embodiment each cell pack comprises a single electrode of each polarity and the negative electrode 2 is simply folded once around the positive electrode 6 as seen in FIG. 1. Thus in this construction no plate straps are required connecting together plates of the same polarity in the same cell. Each cell pack is then placed within a respective plastics bag 9.

The cell packs were then placed in an electrolyte container comprising a shallow rectangular tray 10 with apertures (not shown) formed in its base and side walls. The cell packs were grouped together in the configuration they are to adopt in the finished battery or batteries, in this case groups of three cell packs each, and adjacent groups of cell packs are separated in the electrolyte container by a respective spacer 12. The appropriate intercell connectors 14 are then formed within each group of cell packs by spot welding together adjacent pairs of current take-off lugs 4 over the tops of the intervening plastics bags thereby connecting the groups of cell packs together into battery packs. A terminal pillar 16 is formed around the current take-off lug 4 at each electrical end of each group of cell packs by any conventional method.

The cell packs were then cured by placing the entire container 10 into a recirculating oven whose temperature was 40° C. Moisture was seen to persist in the plastics bags for about twenty-four hours but after forty-eight hours the cell packs were found to be quite dry and the active electrode material appeared to be fully cemented, as indicated by a mechanical vibration test. Tests on the free lead content of the positive electrodes showed an initial free lead content of 12% by weight which reduced to 1.6% after curing. The electrodes were therefore judged to be satisfactorily cured and this was confirmed by subsequent formation and performance characteristics.

The container 10 was then removed from the oven and the cell packs compressed to between 50 and 75% on their natural volume by inserting a packing piece 18 into the container. The container was placed into a vacuum chamber which was then filled with electrolyte which entered the container 10 through the apertures in its walls thereby immersing the cell packs. A sub-atmospheric pressure was then applied to the vacuum chamber and subsequently released to promote an even wetting of the separator material. The electrolyte was then drained from the chamber and from the electrolyte container and the container was placed in a shallow water bath whose depth was slightly less than the height of the plastics bags. The battery packs were then electrolytically formed for e.g. 4 hours and were maintained cool by the water which entered the container 10 through the apertures in its walls.

The volume of electrolyte in each cell pack may be adjusted by varying the height of the plastics bags since each bag is full after immersion and/or by varying the amount by which the cell packs are compressed. Formation may be effected whilst the plastics bags are still full to the top with electrolyte but this may result in a certain splashing of the electrolyte and thus alternatively the packing piece 18 may be removed from the container prior to formation thereby reducing the compression of the cell packs and thus lowering the electrolyte level in the plastics bags. Rather more electrolyte is required for formation than under operation conditions and whilst any excess will ultimately be electrolysed off the excess may be simply squeezed out by further compressing the cell packs after formation.

Subsequently the battery packs were inserted into respective uncompartmented battery containers to which respective lids were then sealed. Each lid has a single vent common to all the cells. It will be appreciated that in the finished batteries adjacent cell packs are not separated by fixed intercell partitions but merely by the material of the plastics bags in which they are accommodated. By virtue of the fact that these bags are open at the top all the cells communicate with a common gas space and thus with the common vent but intercell ionic leakage currents do not occur since there is effectively no free electrolyte available for the conduction of such currents.

In one specific example the battery was formed at a current of 10 amps for $5\frac{1}{2}$ hours and the formation current was then continued overnight for 13 hours at a reduced current of 0.5 amps. During formation the temperature in the interior of one cell was measured and this is shown in FIG. 5. As may be seen, the temperature was initially about 48° C. and this was due to the usual evolution of heat which occurs when adding sulphuric acid electrolyte to a dry cell pack. The temperature then fell relatively rapidly to about 34° C. as a result of the cooling effect of the water bath. The temperature then rose slightly due to the resistive heating effect which results from the fact that at an early stage in formation there are not enough active formation sites for the electric current to be efficiently converted and the excess is converted into thermal energy. After a short time, however, the formation proceeds increasingly rapidly and after about 1 hour the peak resistive heating was finished and formation proceeds efficiently. From this point the temperature fell to about 25° C. at which point nearly all the active material was converted to its active form which occurred after about three hours. After this, a decreasing proportion of the applied electrical energy is stored in chemical form and an increasing amount produces heat and the temperature thus increased again to about 35° C. After about four hours the heating effect ceased to increase and the temperature remained constant. When the formation current was reduced to 0.5 amps the temperature fell rapidly to about 24° C. by reason of the reduced resistive heating effect and then remained constant. Throughout the formation the temperature of the water bath was maintained at 18° C.

In a variant of the above method, the intercell connectors are not formed whilst the cell packs are in the electrolyte container and the cell packs are treated individually and then placed in an outer uncompartmented container 20 (seen in FIG. 3) whereafter the intercell connectors and terminal pillars are formed. In a further variant the intercell connectors are not formed by spot welding the lugs 4 above the plastics bags but by welding straight through the bags. This may be effected by forcing a piercing member through one lug and the plastics bags against a reaction member and then passing a substantial welding current between the piercing and welding members.

In a still further variant which is illustrated in FIG. 4 both the positive and negative electrodes in each cell are folded once and arranged so that the areas of each electrode alternate and are separated by separator material. Each electrode, with the exception of one electrode in each end cell pack, is integrally connected by a bridge piece 22 which constitutes an intercell connector to an electrode of opposite polarity in an adjacent cell pack. In this construction not only are plate straps not required but it is also unnecessary to form intercell connectors. Otherwise the method is the same as described above and it will be appreciated that the three plastics bags around the individual cell packs are not illustrated in FIG. 4.

During the formation of the cell packs a proportion of the electrolyte is electrolysed and thus gassed off. Nevertheless, it is found that in practice the finished battery may still contain a small excess of electrolyte and under these conditions the recombination mechanism of the battery is not particularly efficient. When the battery is charged and gassing occurs both hydrogen and oxygen are evolved initially and this is then lost through the vent. As the amount of electrolyte in the cell packs decreases the recombination mechanism becomes increasingly efficient and the amount of oxygen produced on gassing increases with respect to the amount of hydrogen. After a certain length of time substantially only oxygen is produced on gassing and this is then recombined within the battery.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A method of manufacturing recombination electric storage cells comprising assembling a plurality of cell packs, said cell packs comprising alternating positive and negative electrodes interleaved with compressible fibrous absorbent separator material, placing each said cell pack in a respective open plastic bag, compressing said cell packs to a volume less than their natural volume, immersing said compressed cell packs in electrolyte thereby substantially saturating said electrodes and said separator material, passing an electric current through each said cell pack to electrolytically form it and then inserting said cell packs into a final outer container, said cell packs being permitted to expand from their compressed volume when in the final container.

2. The method of claim 1 wherein said cell packs are placed with the open ends of said plastic bags upwards in an electrolyte container, introducing electrolyte into said electrolyte container to immerse said cell packs whereby each said cell pack is full with electrolyte up to the top of its plastic bag and then draining excess electrolyte from said electrolyte container.

3. The method of claim 1 wherein said cell packs are subjected to a sub-atmospheric pressure whilst immersed in said electrolyte.

4. The method of claim 1 wherein said cell packs are formed whilst substantially surrounded by water subsequent to which said cell packs are inserted into said outer container.

5. The method of claim 4 wherein said cell packs are permitted to expand from their compressed volume prior to being formed.

6. The method of claim 4 which includes further compressing said cell packs subsequent to their formation and prior to their insertion into said outer container to expel at least a portion of said electrolyte from said plastic bags.

7. The method of claim 1 wherein said cell packs are compressed to occupy a volume of 50 to 75% of their natural volume prior to being immersed in the electrolyte.

8. The method of manufacturing a battery of recombination cells wherein each cell is manufactured by the method of claim 1.

9. The method of claim 8 wherein two or more cells are connected by one or more intercell connectors prior to the formation of said cells.

* * * * *